United States Patent [19]

Pearson et al.

[11] Patent Number: 5,481,562
[45] Date of Patent: Jan. 2, 1996

[54] MULTI-MODE MODEM AND DATA TRANSMISSION METHOD

[75] Inventors: Gregory Pearson, Granada Hills, Calif.; Nathan R. Melhorn, Framingham, Mass.; Michael F. Onarato, Acton, Mass.; Craig A. Richards, Wrentham, Mass.

[73] Assignee: Microcom Systems, Inc., Granada Hills, Calif.

[21] Appl. No.: 678,755

[22] Filed: Apr. 1, 1991

Related U.S. Application Data

[62] Division of Ser. No. 431,595, Nov. 3, 1989, abandoned.

[51] Int. Cl.⁶ .................. H04B 1/38; H04L 7/00
[52] U.S. Cl. ............. 375/222; 375/358; 375/377
[58] Field of Search ................. 375/8, 121, 107, 375/94, 109, 222, 377, 340, 356, 358; 371/32; 379/93

[56] References Cited

U.S. PATENT DOCUMENTS

| | | | |
|---|---|---|---|
| 4,680,773 | 7/1987 | Smundson | 375/121 X |
| 4,680,781 | 7/1987 | Amundson et al. | 375/8 |

*Primary Examiner*—Stephen Chin
*Assistant Examiner*—Tesfaldet Bocure
*Attorney, Agent, or Firm*—Lappin & Kusmer

[57] ABSTRACT

A multi-mode modem and a method of transmitting data utilizing the multi-mode modem are disclosed in which different modes of operation may be automatically selected by sending multiple link requests to a receiving modem in order to provide either optimized or non-optimized data transmission according to line conditions.

4 Claims, 3 Drawing Sheets

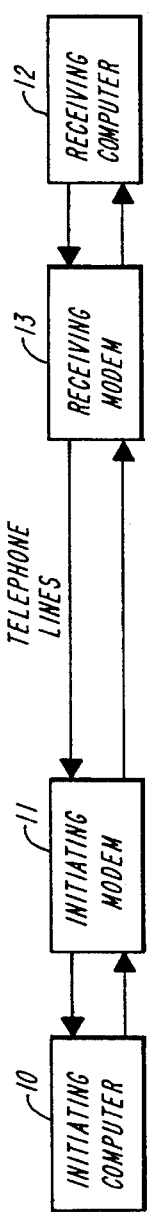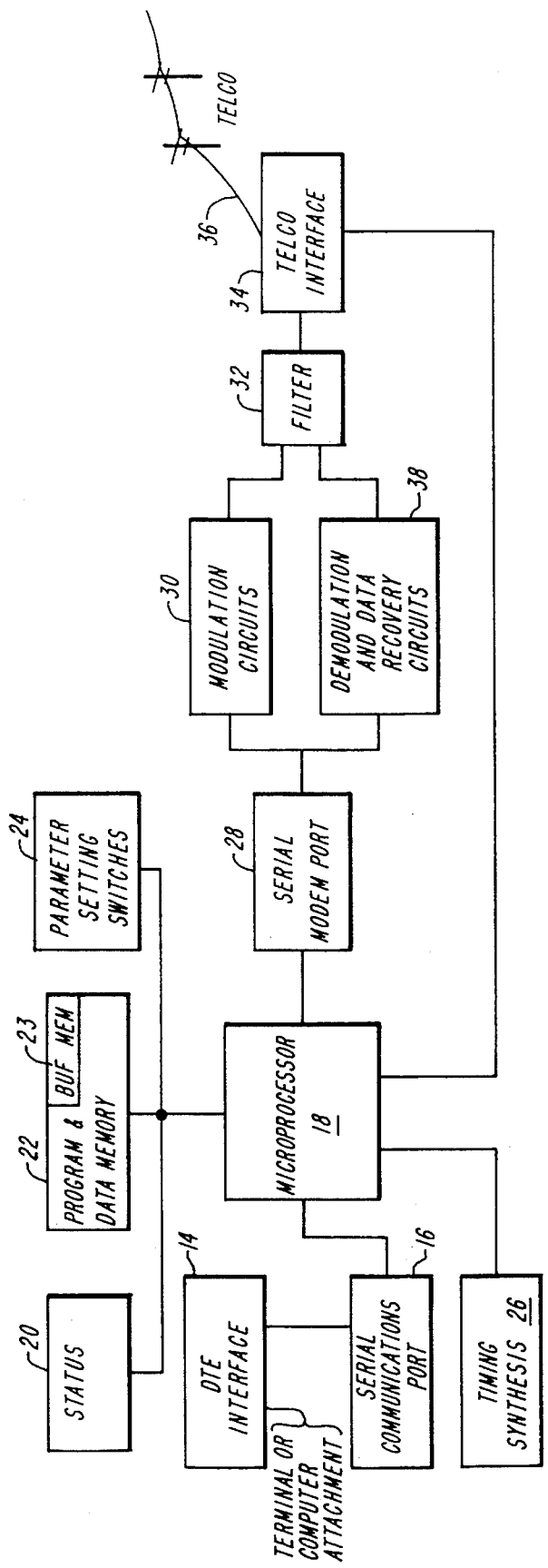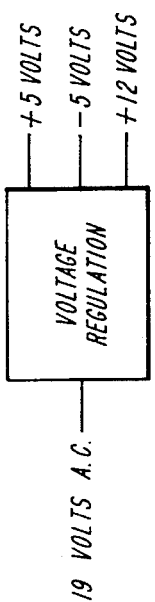

MULTI-MODE MODEM AND DATA TRANSMISSION METHOD

This application is a division of application Ser. No. 07/431,595, filed Nov. 3, 1989, now abandoned.

BACKGROUND OF THE INVENTION

This invention relates generally to a data telecommunications system, and more particularly to a system which transmits data in packets, the size of which may be changed based on transmitting conditions. The invention also relates to the efficient establishment of a data transfer link between two microcomputers over telephone lines. The subject matter of the present invention is particularly effective in data transfers in which the line quality may be poor or may rapidly change from good quality to poor quality. An example of this is cellular communications, which presents widely varying degrees of line quality, although cellular communications is not the only medium in data communications in which line quality may be poor or may vary. Telephone lines also possess such qualities.

Whereas microcomputers were once only used as dedicated and completely isolated devices, they are now used for a wide range of applications, many of which require microcomputers to communicate with each other. Problems develop with such communication because of the existence of a wide variety of microcomputers which are incapable of directly communicating with each other. As a result, many data communication systems for microcomputers force the microcomputer to work principally as a dumb terminal for a remote mini- or mainframe computer. Therefore, to facilitate more sophisticated communication, communication protocols which enable data communications between a wide range of computers, from low end microprocessors to large mainframes, have been developed. The proliferation of protocols, however, not to mention operating systems and microprocessors, has for the most part precluded the adoption of a standard file transfer method.

A communication protocol is basically a set of rules that defines how the computers interact. For two computers to transfer a file successfully, they must observe the same protocol. Typically, a protocol specifies when to send a message, how to format the information in the message, and at the other end, how to acknowledge the receipt of the message.

Simple physical connect protocols are concerned only with hardware configurations. Establishing the basic physical connection between two computers requires that a particular series of steps be followed. The originating modem initiates its sending sequence, and the telephone number representing the electronic address of the receiving modem is formatted as a series of pulses or tones and sent into the telephone network. The receiving modem senses the incoming call as a relatively high voltage (sufficient to cause a phone to ring) and interprets this as a request to establish a connection. If the connection is established, an acknowledgement message sent to the transmitting modem thereby establishes the connection. Such a physical link is capable of being established because both modems use the same physical connect protocol. These basic connect protocols are fairly standard, particularly for the low speed, asynchronous modems commonly used with microcomputers, such as Bell 103 and 212 A modems. However, as communications become more complex and involve dissimilar machines and file formats, the protocols must, in turn, become increasingly sophisticated.

Connecting two computers is only a small part of the communications work necessary for accurate data transfer. Telephone lines are often noisy, and errors can crop up in the transmitted data. These errors must be detected and corrected. The resources available to store incoming data must also be passed and matched so that the recipient is not flooded with data. Also, information regarding the computer file system must be swapped, and file movement and manipulation must be defined. These concerns, therefore, go beyond the physical-level protocols into the realm of complex communications protocols.

One protocol which enables complex communications between microcomputers is the Microcom Networking Protocol (MNP) which has been developed by Microcom, Inc. of Norwood, Mass. MNP provides a sophisticated communications system which includes provisions for both reliable terminal-type communications and reliable file transfer in a manner which can reasonably be implemented on a wide range of computers. MNP accounts not only for hardware and operating system differences, but also provides sophisticated error checking. As a result, file exchanges are thus possible between almost any computers using an MNP based communication system.

The MNP protocol, which has been developed principally for use with microcomputers, includes three layers, and the use of only three layers enables MNP to provide the necessary services with the desired space and performance characteristics for a microcomputer environment. The three layers or modules are combined to perform a series of complex functions in a manner in which changes in one module may not drastically affect another module, as long as certain parts of the module's interface remain the same.

In MNP, each layer is relatively isolated and provides a specific service. If a change is forced in one layer (for example, if MNP is modified for use on a new computer), the change is confined to that layer while the layer's standard interface to the other layers remains unchanged. In addition to ensuring machine portability, MNP's structure allows services provided by one layer to support those in the layer above. The accumulation of services is then passed upward, from layer to layer to the applications program. MNP defines three unique protocol layers in addition to the physical connection; the link, the session, and the file protocol layers. The protocol layers are triggered sequentially from the bottom (physical) to the top (file transfer).

The link layer is responsible for providing reliable, controlled data transmission over a medium that is inherently noisy and likely to cause errors. Once a physical connection is established between two machines, the link protocol acts as a negotiator causing both computers to agree on the nature of the link. For example, the link protocol establishes whether the connection will be half- or full-duplex, how many data messages can be sent before confirmation is required, the size of a single data packet, etc. After establishing values for the above requirements, the link protocol initiates data transfer, paces the flow of data and, if necessary, re-transmits data messages that contain errors due to telephone line noise. The link protocol allows blocks or packets of data (as opposed to individual bytes) to be send synchronously or asynchronously to the receiving computer. Data transfer is faster when packets are transmitted synchronously because start and stop characters are not needed, and as a result, the ratio of data to control characters regulating the transfer is higher. Control is possible because of a mainframe-like (framing) technique in which a block of data is carried from both ends with specific codes.

The session layer negotiates with the receiving computer with respect to the pertinent system and file information including computer type, how files are formatted, the type of information transmitted (e.g. ASCII, binary) and the user's identity. This layer also provides the automatic negotiation of which level of service can be used between the two communicating devices.

The file transfer layer defines and formats the messages involved in file transfers and manipulations. There are three transfer services available: one allowing the sending of a file, the second allowing the receipt of a file, and the third allowing the appending of a file to an existing file at the other end of the communications link. The file transfer protocol also enables the manipulation of distant computer files. For example, such files can be deleted, renamed or file directories may be displayed. A typical file transfer starts when one computer sends a "file start" message to the other computer. The file start message includes the requested file's name, size and format along with any password needed for the file's return trip to the requesting computer. Both computers exchange "hellos" along with a confirmation that a file will be soon filed by one side and accepted by the other.

In order for any communications protocol to facilitate communications among a wide variety of computers, the protocol must be able to operate in a number of modes. These modes include a matched-protocol mode for use by two communicating devices supporting the same protocol. Such a matched-protocol mode may provide optimized data transmission including any of a number of known optimizing features such as detecting and correcting errors, optimizing transmission speed, etc. A second mode which allows straight forward data transmission (without any optimizing features) between two communicating systems must also be provided. The operating mode is generally negotiated in a lower link layers, and in MNP the mode is selected in the link layer.

A modem operating under the MNP protocol discussed above has four basic modes: reliable mode, normal mode, auto-reliable mode, and direct mode. The reliable mode is the basic matched-protocol mode of MNP which provides error detection and automatic re-transmission of data when an error occurs in order to ensure that communications between two communicating systems are error-free. In order to utilize this reliable mode, however, both of the communicating modems must be able to support this mode. A second mode, MNP's normal mode, allows a modem with MNP to communicate with a modem not supporting this protocol. MNP's auto-reliable mode is an extension of the reliable mode which will automatically connect two modems in a reliable mode if such a connection is possible. In other words, if both of the communicating modems can support MNP, a reliable, error-correcting connection is established. The auto-reliable mode differs from the reliable mode insofar as the modem in the auto-reliable mode initially looks for incoming MNP protocol characters from the remote modem. If, after a predetermined amount of time has expired, these MNP characters are not detected, a normal link is established. If these characters are detected, a reliable link is established. A fourth mode, the direct mode, is used for special purpose formats or character sets, and the modem buffers and flow control command settings are ignored.

A fifth mode, a subset of auto-reliable mode, called the special or smart auto-reliable mode, contains a special or "fallback" character or set of characters which indicate that a non-matched protocol should be established. The features of the special or smart auto-reliable mode are described and claimed in U.S. Pat. No. 4,680,773 for "Data Communications System and Method Utilizing a Multi-Mode Modem", assigned to the assignee of the present invention, the disclosure of which is hereby incorporated by reference. One aspect of the present invention is a subset of both auto-reliable and special auto-reliable modes, and is especially effective when telephone line quality may have deteriorated. This mode, entitled Robust Auto-Reliable mode, is explained in greater detail below.

Data sent from one modem to another is usually transmitted as part of a data packet, the size of which is determined by the link layer. Data packets generally include, in addition to the data, header and trailer data which among other purposes identifies the beginning (header) and end (trailer) of each data packet. The header and trailer information may also be used for indicating the type of packet (e.g. acknowledgement, control, data packet), the CRC code, and any other identifying information. While the data packets are very useful for maintaining error-free transmission, the header and trailer information increases the amount of data transmitted and as a result data throughput is reduced.

In order to increase the data transmission rate or throughput, many techniques involving the manipulation of the transmitted data are utilized. One such technique is to increase the size of the packets of data which are sent by a modem. Such increased packet size produces an increase in throughput because there is less header and trailer information sent since fewer packets are actually transmitted. U.S. Pat. No. 4,691,314, owned by the assignee of the present invention, discloses and claims a system for transmitting data in adjustable-sized packets, of which the present invention is an improvement upon.

while ideally such increased packet size should speed transmission, the nature of the transmitting environment may lead to the opposite result. Since telephone lines are often noisy (present, for example, in cellular communications in which not only may line quality be poor, but also that it may be erratic and rapidly fluctuate between good and poor line quality) and other hardware problems produce errors in the transmitted data, it is often necessary when using an error-correcting protocol to re-transmit many packets of data which contain data errors. The re-transmission of larger sized packets thereby results in unnecessary transmission of data because for each altered transmitted character many more correctly transmitted characters must be re-transmitted thereby decreasing throughput. Therefore, if many data packets are re-transmitted, smaller packet sizes are actually beneficial since less data has to be re-transmitted.

Known modems which transmit data in packets are designed so that the packet size is chosen which compromises the advantages of large packet sizes with the advantages of small packet sizes. The nature of the transmitted data, as well as the transmitting conditions, however, frequently change so that any particular packet size will, in reality, not be optimum for all situations.

It is therefore a principal object of the present invention is to provide a data transmission system and method in which the packet size of the data being sent by a modem over telephone lines is optimized.

Another object of the present invention is to provide a data communication system and method in which the data packet size can be optimized in a real time as a function of the data stream being transmitted as well as the transmitting environment using additional idle packets.

Still another object of the present invention is to provide a data communications system and method in which data may be transmitted in any of a number of packet sizes Yet another object of the present invention is to provide a data communications system and method in which an additional mode of operation may be selected to connect two modems over telephone lines which is especially effective for conditions when line quality may not be optimum.

SUMMARY OF THE INVENTION

In accordance with the present invention, a data telecommunications system and method is provided for sending in a data stream of characters in distinct data packets between two units of data terminal equipment (which can be either terminals and/or computers) connected over communication lines (the Aggressive Adaptive Packet Sizing mode). A modem is connected between each unit of data terminal equipment and the communication lines, and one initiating modem includes a means for changing the packet size of the data which is transmitted. The receiving modem checks the packets for errors, and if errors are found, the packet is re-transmitted by the initiating modem.

The initiating or transmitting modem observes each data packet transmitted with and without error(s) and dynamically changes each packet size. The transmitting modem also sends idle packets to the receiving modem during intervals in which there is no data transmission and likewise observes whether error(s) occur in the transmission of such idle packets. The line quality is determined in real time so that a change in the transmitting environment will result in a change in the packet size.

In addition, the present invention includes an additional mode (the Robust Auto-Reliable mode) under which the modem may operate, particularly when line quality is not optimum. This new mode features the sending of multiple link requests to a receiving modem and, upon detection by the receiving modem of what might be, but is not certain to be, a link request, the sending modem adds a further predetermined amount of time over and above the amount of time present in auto-reliable mode to allow the receiving modem to detect further multiple incoming MNP protocol characters. As a result, when under the prior system of auto-reliable mode an MNP connection may not have been made due to poor line quality, under this aspect of the invention, such connection will be made.

These and other objects and features of the present invention will be better understood from the following detailed description which should be read in light of the accompanying drawings in which corresponding reference numerals refer to corresponding parts throughout the several views.

BRIEF DESCRIPTION OF THE DRAWINGS

FIG. 1 is a generalized schematic view of a data telecommunications system;

FIG. 2 is a schematic view of a modem of the present invention;

DETAILED DESCRIPTION OF THE PREFERRED EMBODIMENT

Figure 3:
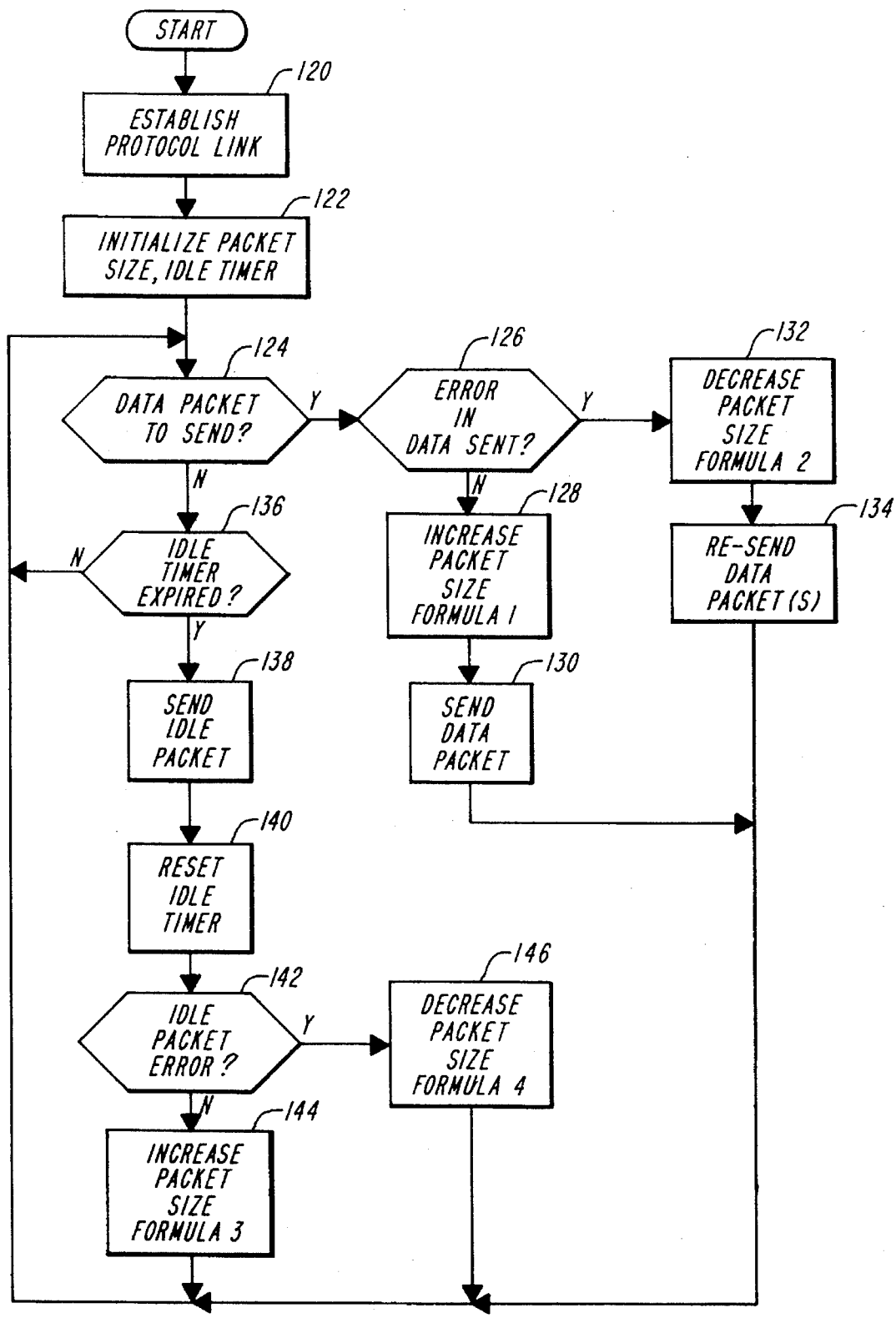
FIG. 3 is a flow diagram of the steps utilized by the modem of the present invention in optimizing the size of the transmitted data packets.

A basic data telecommunications system, shown in FIG. 1 includes an initiating unit of data terminal equipment (DTE) 10, such as, but not limited to, a dumb terminal or a microcomputer, and a receiving unit of DTE 12. An initiating modulator/demodulator (modem) 11 is connected between unit 10 and communication lines (such as, but not limited to telephone lines), and a receiving modem 13 is connected between unit 12 and communication lines.

A modem of the communication system of the present invention is shown in FIG. 2. The system of the Aggressive Adaptive Packet Sizing mode of the present invention will normally include at least two modems of the type described below. While the system of the Robust Auto-Reliable mode may include only one modem of the type described below, it is preferable that both modems be of this type. For purposes of the following discussion, the modem of the system will be described with reference to modem 13, although the modem 11 for the purposes of this disclosure may be treated as containing identical circuitry and capabalities. The modem 13 includes a DTE-interface 14 which receives data coming from DTE unit 12. Data characters supplied to the DTE-interface 14 pass through a serial communications port 16 of the microprocessor 18 to which characters are fed in a serial fashion. The microprocessor 18 has connected to it status indicators 20, a program and data memory 22 and parameter setting switches 24. Timing synthesizing circuitry 26 is also connected to the microprocessor 18. Data processed by the microprocessor 18 is sent through a serial modem port 28 to modulation circuits 30 which will pass data on through a filter 32 to a telephone interface 34 and then on communication lines over which the data will be transmitted to another microcomputer. The modem 13 also includes demodulation and data recovery circuits 38 which are used for receiving data from another remotely situated modem, such as modem 11. When the modem 13 acts as a receiving modem, data passes through the same elements described above in a reverse order following the passage of data through the demodulation and data recovery circuits 38.

A modem of the data telecommunications system of the present invention optimizes the size of the data packets taking into account the number of re-transmissions of data packets and idle packet errors. The optimizing or adapting of the packet size is preferably performed in real time so that changes in the transmitting environment will result in changes in packet size, thereby maintaining an optimum throughput. Idle packets will be sent when there is no data from associated DTE 10 to send to modem 13, and are used to give modem 11 an idea of the line conditions when there are no data packets to be used to determine line quality. Referring to FIG. 3, in order to enable a modem to optimize or adapt the packet size of transmitted data, a matched protocol link that has negotiated a class that supports the adaptive packet sizing must first be negotiated, as shown in step 120. In step 122, the modem 11 must initialize maximum packet size, as well as initializing and starting an idle transmission timer to determine when the transmitter is idle. If there is data from DTE 10, the modem 11 will check to see if there were errors in any previously transmitted packets in step 126.

This error checking is performed by the receiving modem 13, which will request a re-transmission if it has missed a data packet. If modem 13 has requested a re-transmission, the modem 11 will perform step 132 to decrease the maximum packet size according to formula 2. It should be noted that the maximum does not apply to packets which must be re-transmitted. Then modem 11 will re-transmit any packets sent that were not correctly received by modem 13. After these packets are re-sent in step 134, program control will return to step 124. If modem 13 has not requested any re-transmissions, modem 11 will perform step 128 to increase the maximum packet size according to formula 1. After this increase in packet size is performed, modem 11 will transmit data from DTE 10 in a data packet to modem 13. When this packet is sent, modem 11 will then loop back and perform step 124.

If there is no data with which to build packets in step 124, the modem 11 will go to step 136 and determine if the idle timer has timed out. If the idle timer is still running, modem 11 will loop around to step 124 and check for data from DTE 10 again. If idle timer has in fact timed out in step 136, then modem 11 will send an idle packet. The purpose of this packet is to transmit characters to modem 13 so that modem 11 will know if there exist line conditions which would cause errors in its transmitted data. Each idle packet will carry a sequence number that modem 13 will use to determine if it has received all the idle packets in order. If modem 13 has not received a packet in order, it will inform modem 11 about this. After modem 11 has transmitted its idle packet in step 138, it will reinitialize and restart its idle timer. Then it will check if the remote modem 13 has received an idle packet out of order. If there has been an idle packet error, modem 11 will decrease its data packet size in accordance with formula 4 shown in step 146. Otherwise, if step 142 determines that the idle packets were received without error by modem 13, modem 11 will perform step 144, increasing data packets size using formula 3. After steps 144 or 146, the program will return to step 124.

The format of the formulas is data packet size=data packet size multiplied by a constant. The data packet size is then tested to determine if it is less than the minimum data packet size or greater than the maximum size. If it is outside the acceptable range, it is then set to the minimum or maximum size, as appropriate. The constant in the formula is defined separately for each formula as described below. By adjusting the value of the constant, the rate of change of packet size can be adjusted. Some consideration needs to be given to the relative value of the constants, so that the packet size will not react too quickly to errors and take too long to recover from them.

The formula used to increase packet size is as follows:

$$PS=MAX[(MIN[PS'\times X],[PSMAX])],[PSMIN]$$

The formula used to decrease packet size is as follows:

$$PS=MAX[(MIN[PS'\times Y],[PSMAX])],[PSMIN]$$

Where:
PS=New Packet Size
PS'=Previous Packet Size
X=Increasing constant
Y=Decreasing constant
PSMAX=Maximum Packet Size
PSMIN=Minimum Packet Size
MIN[X1],[X2]=Use Minimum of X1 and X2
. MAX[X1],[X2]=Use Maximum of X1 and X2

Formulas 1 and 3 are special cases of the formula used to increase packet size. It is possible, but not necessary, to set the constant X for formulas 1 and 3 to be identical. The value of constant X must be greater than 1 to insure that packet size increases. The value of constant X depends on many factors, including the physical link used and on the matched protocol used. In the example of FIG. 3, suitable values could be PSMAX=256, PSMIN=8, an initial packet size of 16, and a range for constant X from 1.005 to 1.120.

Formulas 2 and 4 are special cases of the formula used to decrease packet size. It is possible, but not necessary, to set the constant Y for formulas 2 and 4 to the same value. If constant Y is set the same, formulas 2 and 4 would be identical. The value of constant Y must be less than 1 to insure that packet size decreases. The value of constant Y depends on many factors, including the physical link used and on the matched protocol used. In the example of FIG. 3, suitable values could be PSMAX=256, PSMIN=8, an initial packet value size of 16, and a range for constant Y from 0.50 to 0.95.

Another aspect of the present invention is the provision of the Robust Auto-Reliable mode referred to above. For purposes of the following discussion, the "auto-reliable" mode refers to a mode of operation of a modem in which a matched-protocol link is automatically established if both modems are capable of operating under such a matched-protocol. If both modems cannot operate under the matched-protocol, a normal mode connection is automatically established.

Figure 4:
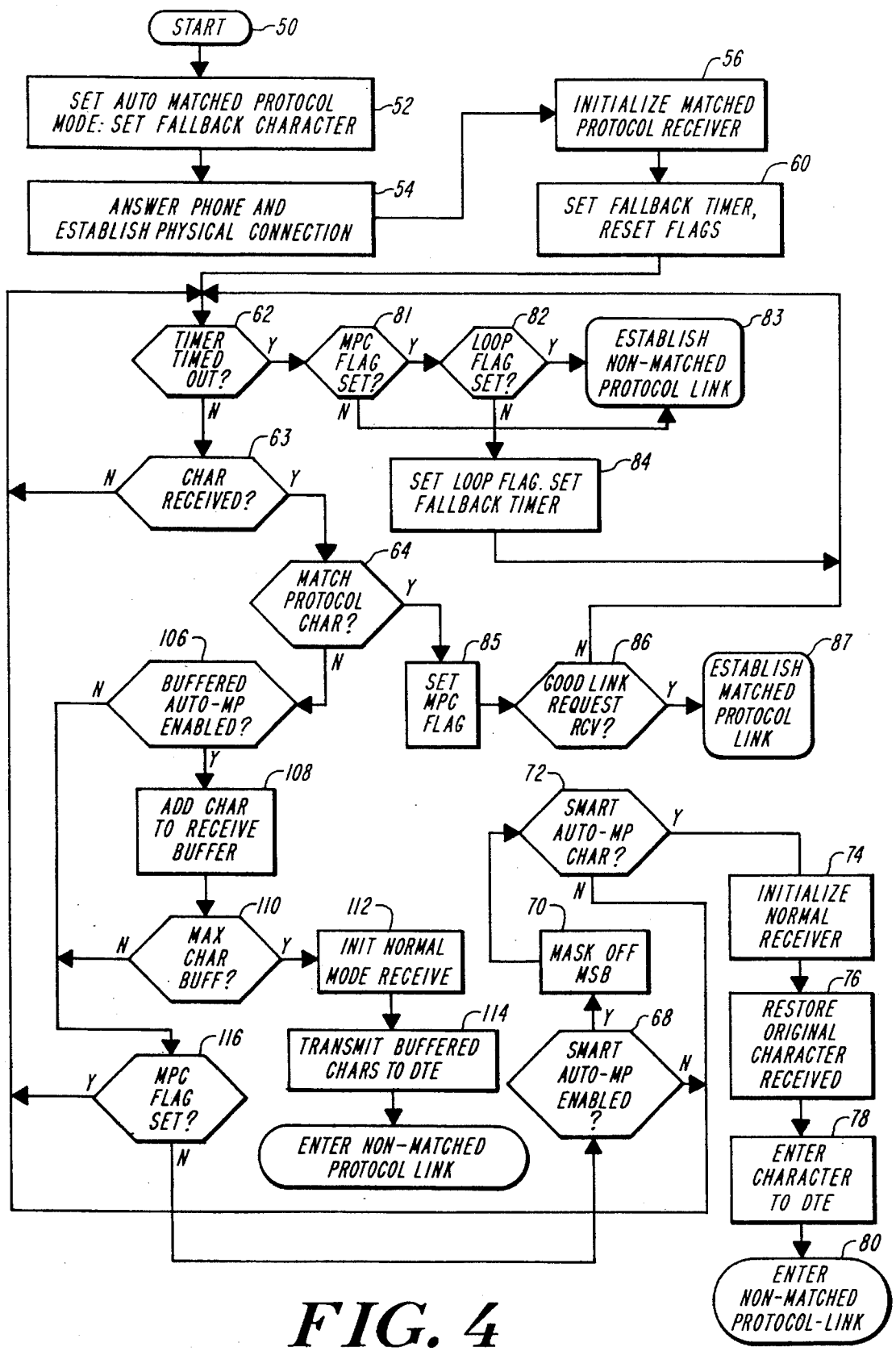
FIG. 4 is a flow diagram of the steps utilized in the modem of the present invention to provide an auto-reliable connection in non-optimum line quality conditions.

Referring now to FIG. 4, a modem capable of operating under an auto-reliable mode is enabled for operation in the auto-reliable mode 50. A special or "fallback" character or set of characters that indicate that a a non-matched-protocol link should be established are set in step 52. Such characters are generally the first characters sent by a computer of the type which will attempt to establish a connection with receiving unit 12. When a call is received by a receiving modem 13, a physical connection is established in step 54. The receiving modem 13 is initialized for matched protocol receiver operation in step 56. In step 60, the modem 13 initializes and starts a timer to time the auto-reliable operation, in addition to resetting the matched protocol character and loop flags. The receiving modem 13 then enters a loop, in which it constantly checks if the auto-reliable timer set in step 60 has timed out or if a character has been received. If the auto-reliable timer times out in step 62, the modem 13 will then check if the matched protocol character received flag has been set in step 81. If that flag is set, modem 13 checks if the loop flag is set in step 82. If the loop flag is set, then step 83 causes modem 13 to establish a non-matched-protocol link. If the loop flag is not set in step 82, step 84 sets the loop flag, in addition to re-initializing and restarting the auto-reliable timer. The modem 13 loops back to step 62. If, in step 81, the matched protocol flag is not set, then step 83 is executed, in which modem 13 sets up a non-matched protocol connection.

If in step 62 the auto-reliable timer has not timed out, modem 13 will check if the character has been received from modem 11 in step 63. If a character has not been received, the modem 13 loops around to step 62. If a character has been received from the initiating modem, step 64 is executed. If the character necessary for initiating a matched protocol link is detected in step 64, the modem 13 will set the matched protocol character received flag in step 85. If the matched protocol link negotiation parameters are correctly received from modem 11 in step 86, then a matched protocol link is established in step 87. If the matched protocol link negotiation is incorrect in step 86, then the modem 13 returns to step 62.

If, in step 64, the necessary character for signaling a desire to establish a matched protocol link is not detected, the modem 13 then checks, in step 106, whether the modem is enabled to operate in buffered auto-reliable mode. If the modem 13 is not enabled for the buffered auto-reliable mode, then the modem will advance to step 116 to check if the matched protocol character has been received. If, on the other hand, the buffered auto-reliable mode is enabled, the character is placed in a character buffer 23 in the program and data memory 22 of the modem 13. In step 110 the modem determines whether the buffer 23 has been filled, and if buffer 23 is not filled, then control shifts to step 116, where it checks the matched protocol character flag. If the character buffer 23 has been filled, the modem initializes itself to operate under a non-matched protocol mode in step 112, and in step 114 the buffered characters are transmitted through serial port 16 and DTE-interface 14 to the terminal or computer 12 to which modem 13 is connected. At this point, communications will continue with the modem operation in a non-matched protocol mode.

In step 116, the matched protocol received flag is checked to determine if the beginning of the matched protocol negotiation had been attempted. If this character had been received, then control returns to step 62 to once again check the auto-reliable timer. Otherwise, if no matched protocol character has been received, step 68 will be executed.

In step 68, the modem 13 checks whether the modem is enabled to operate in smart or special reliable mode and thereby recognize the fallback character or set of characters indicating the desire of the initiating modem 11 to establish a non-matched protocol link. If the modem 13 is not enabled to recognize the fallback character(s), then the program control will be passed to step 62.

If the modem 13 is enabled to detect a specific character for establishing a non-matched-character mode connection, then in step 70, the most significant bit is masked off the data character under examination. The reason for this masking off of the most significant bit is that the most significant bit serves as a parity bit and is not needed for determination of the operating mode.

After masking off the most significant bit in step 70, the modem 13 will determine in step 72 whether the character currently under examination is actually the fallback character. If the examined character is not the fallback character, then control returns to step 62, and the auto-reliable timer is checked to determine if there is time remaining on it. If, on the other hand, the fallback character is detected, the modem 13 initializes itself for operation under a non-matched-protocol mode in step 74, and the fallback character is restored by replacing the most significant bit in step 76. The restored character is then sent to the computer or terminal through the serial communications port 16 in step 78. From this point onward, the modem 13 will operate in a non-matched-protocol mode without any error detection or other special features normally associated with the matched-protocol mode.

While the foregoing invention has been described with reference to its preferred embodiments, various modifications and alterations will occur to those skilled in the art. All such modifications and alterations are intended to fall within the scope of the appended claims.

What is claimed is:

1. A method of initiating data telecommunications between at least a first unit of data terminal equipment and a second unit of data terminal equipment, over a communications medium, each of said first unit and said second unit of said data terminal equipment being connected to said communications medium through, respectively, a first modem and a second modem, said first modem operating as an initiating modem when said second modem is operating as a receiving modem and said first modem operating as a receiving modem when said second modem is operating as an initiating modem, at least one of said first and second modems being capable of operating in at least a special mode and a normal mode, said at least one modem operating in (A) said special mode so as to provide for (1) optimized data transmission by pacing the flow of data between said first and second modems, (2) error detection of errors in a transmitted data stream from said initiating modem to said receiving modem and (3) the automatic re-transmission of said transmitted data stream by said initiating modem to said receiving modem when an error is detected, and (B) said normal mode so as to provide for the direct, non-optimized transmission of a data stream without any error detection analysis of the data stream or automatic re-transmission of the transmitted data stream by said initiating modem to said receiving modem, said method comprising the steps of:

(a) establishing a physical connection between said initiating modem and said receiving modem;

(b) transmitting a data stream of data characters from said initiating modem to said receiving modem over said communication medium;

(c) examining in said receiving modem a next received character in said data stream transmitted by said initiating modem to said receiving modem;

(d) attempting to establish a special mode link between said initiating and receiving modems if said next received character examined by said receiving modem is a special mode indicating character that completes a special mode link request of the type including a plurality of special mode indicating characters, and attempting to establish a normal mode link if said next received character is a normal mode indicating character;

(e) repeating steps (c) and (d) after fetching another data character from said data stream until a complete sequence of special mode indicating characters of a special mode link request is detected, or until a normal mode indicating character is detected, or until a first preselected period of time has elapsed;

(f) repeating steps (c) and (d) for a second preselected period of time upon the detection within said first preselected period of time of a portion of a special mode link request to provide said receiving modem with an additional opportunity to detect either a complete special mode link request, or said normal mode indicating character; and (g) continuing the transmission by said initiating modem of said stream of data under either said special mode or said normal mode until all of said data stream has been transmitted.

2. In a method of operating a multi-mode modem as a receiving modem in a data telecommunications system, said multi-mode modem being capable of operating in a special mode or a normal mode, said multi-mode modem providing (A) when operating in said special mode: (1) optimized data transmission that paces the flow of data between an initiating modem and said multi-mode modem and (2) error detection of errors in a transmitted data stream and automatic re-transmission of said data stream by said initiating modem when an error occurs, and (B) when operating in said normal mode; direct, non-optimized data transmission that provides transmission of the data stream without error detection of errors in the transmitted data stream and without automatic re-transmission of said data stream by said initiating modem when an error occurs, wherein a first time period is allotted for the detection of a special mode indicating character in said data stream such that at the expiration of said first time period a normal mode link is established if said special mode indicating character is not detected, the improvement comprising the steps of:

(a) sending more than one link request from said initiating modem to said multi-mode modem operating as a receiving modem; and (b) upon detection within said first time period by said multi-mode modem of at least a portion of a special mode link request having a sequence of special mode indicating characters, providing a second time period after said initial time period to provide said receiving modem with an additional opportunity to detect a complete special mode link request.

3. A multi-mode modem for connecting between a unit of data terminal equipment and a communications medium to facilitate data telecommunications, said multi-mode modem operating as a receiving modem for receiving data transmitted across said communications medium from a second modem operating as an initiating modem, said multi-mode modem being capable of operating in a special mode or a normal mode, said multi-mode modem providing for (A) when operating in said special mode: (1) the optimized transmission of data by pacing the flow of data between said multi-mode modem and said initiating modem, (2) the detection of errors in a transmitted data stream from said initiating modem to said multi-mode modem and (3) the automatic re-transmission of said transmitted data stream by said initiating modem when an error is detected, and (B) when operating in said normal mode the direct, non-optimized transmission of data from said initiating modem to said multi-mode modem in order to provide for the simple transmission of data without any error detection analysis of the data stream or associated automatic re-transmission of said data stream when an error is detected, said multi-mode modem comprising:

(a) means for receiving a transmitted stream of data characters from said initiating modem;

(b) detection means for detecting at least one special mode indicating character or a normal mode indicating character in said received stream of data characters;

(c) first timing means cooperative with said detection means, for allotting an initial first time period during which said detection means may detect in said received stream of data characters a special mode link request having a sequence of special mode indicating characters;

(d) second timing means, cooperative with said detection means, for providing a second time period if a portion of a special mode link request is detected by said detection means during said first time period, the second time period being for detecting additional special mode indicating characters in said received stream of data characters until a complete special mode link request is detected, or until said normal mode indicating character is detected;

(e) means for causing said multi-mode modem to operate in said special mode upon detecting said complete special mode link request; and (f) means for causing said multi-mode modem to operate in said normal mode upon detecting said normal mode indicating character or upon the expiration of said initial and extended time period.

4. A data telecommunications system for providing data communications between at least a first unit of data terminal equipment and a second unit of data terminal equipment over a communication medium, said system comprising: a first modem connected between said first unit of data terminal equipment and said communication medium and a second modem connected between said second unit of data terminal equipment and said communication medium equipment, at least one of said first and second modems operating as a receiving modem capable of operating in either a special mode or a normal mode, said other of said first and second modems operating as an initiating modem when said one of said first and second modems is operating as a receiving modem, said receiving modem providing for (A) when operating in said special mode: (1) the optimized transmission of data by pacing the flow of data between said receiving modem and said initiating modem, (2) the detection of errors in a transmitted data stream from said initiating modem to said receiving modem, and (3) the automatic retransmission of said transmitted data stream by said initiating modem when an error is detected, and (B) when operating in said normal mode the direct, non-optimized transmission of data from said initiating modem to said receiving modem in order to provide for the simple transmission of data without any error detection analysis of the data stream or associated automatic re-transmission of said data stream when an error is detected, said receiving modem being capable of operating in said special and normal modes and including:

(a) means for receiving a stream of data characters transmitted from said initiating modem;

(b) detection means, cooperative with said means for receiving, for detecting a special mode link request having a plurality of special mode indicating characters, and for detecting a normal mode indicating character in said received stream of data characters;

(c) first timing means, cooperative with said detection means, for allotting a first time period during which said receiving modem may detect a sequence of special mode indicating characters in said received stream of data characters;

(d) second timing means, cooperative with said detection means for providing a second time period when said detection means may detect a sequence of special mode indicating characters in said received stream of data characters, said second timing means adding said second time period to said initial time period only upon detection by said detection means of receipt of a portion of a special mode link request during said first time period to provide said receiving modem with an opportunity to complete detection of either said special mode link request, or said normal mode indicating character;

(e) means for causing said receiving modem to operate in said special mode upon detecting said special mode link request; and (f) means for causing said receiving modem to operate in said normal mode upon detecting said normal mode indicating character or upon the expiration of said initial and extended time period.

* * * * *